United States Patent
Muramoto

(10) Patent No.: US 11,328,501 B2
(45) Date of Patent: May 10, 2022

(54) COMPUTER-READABLE RECORDING MEDIUM RECORDING SPECIFYING PROGRAM, INFORMATION PROCESSING APPARATUS, AND SPECIFYING METHOD

(71) Applicant: FUJITSU LIMITED, Kawasaki (JP)

(72) Inventor: Takahide Muramoto, Zama (JP)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 16/929,180

(22) Filed: Jul. 15, 2020

(65) Prior Publication Data

US 2020/0342254 A1 Oct. 29, 2020

Related U.S. Application Data

(63) Continuation of application No. PCT/JP2018/003282, filed on Jan. 31, 2018.

(51) Int. Cl.
*G06V 10/75* (2022.01)
*G06V 30/414* (2022.01)
*G06V 30/416* (2022.01)

(52) U.S. Cl.
CPC .......... *G06V 10/751* (2022.01); *G06V 30/414* (2022.01); *G06V 30/416* (2022.01)

(58) Field of Classification Search
CPC .......... G06K 9/00463; G06K 9/00469; G06K 9/6202; G06F 40/14; G06Q 40/00; G06V 30/414; G06V 30/416; G06V 10/751

(Continued)

(56) References Cited

U.S. PATENT DOCUMENTS

2003/0198850 A1 10/2003 Suzuki et al.
2009/0006472 A1* 1/2009 Bush ............ G06Q 40/00
(Continued)

FOREIGN PATENT DOCUMENTS

JP  2003-316765 A  11/2003
JP  2005-267195 A  9/2005
(Continued)

OTHER PUBLICATIONS

International Search Report and Written Opinion of the International Searching Authority (Form PCT/ISA/210, 220, and 237), mailed in connection with PCT/JP2018/003282 and dated Mar. 20, 2018 (12 pages).

(Continued)

*Primary Examiner* — Daniel G Mariam
(74) *Attorney, Agent, or Firm* — Fujitsu Patent Center

(57) ABSTRACT

A non-transitory computer-readable recording medium records a specifying program for causing a computer to execute processing including: receiving a first file; acquiring information indicating a correspondence relationship between an item included in the first file and an item included in a second file; acquiring an item value associated with identification information of the received first file with reference to a storage that stores an item value associated with a specific item included in a file in association with the identification information of the file; comparing the item value associated with the specific item among the items included in the received first file with the acquired item value; and specifying a target item associated with an item value associated with a second item included in the received first file among items included in the second file on the basis of the comparison result and the acquired information.

3 Claims, 15 Drawing Sheets

(58) Field of Classification Search
USPC .......................................................... 382/218
See application file for complete search history.

(56) References Cited

U.S. PATENT DOCUMENTS

| | | | |
|---|---|---|---|
| 2012/0278694 A1* | 11/2012 | Washio | ................. G06F 40/197 |
| | | | 715/205 |
| 2016/0275180 A1 | 9/2016 | Matskevich | |
| 2019/0095412 A1 | 3/2019 | Onogi et al. | |

FOREIGN PATENT DOCUMENTS

| | | |
|---|---|---|
| JP | 2008-165641 A | 7/2008 |
| JP | 4499086 B2 | 7/2010 |
| RU | 2605077 C2 | 12/2016 |
| WO | 2015/166973 A1 | 11/2015 |
| WO | 2017/199309 A1 | 11/2017 |

OTHER PUBLICATIONS

Japanese Office Action dated Jul. 20, 2021 for corresponding Japanese Patent Application No. 2019-568490, with English Translation, 7 pages. *Please note JP-2005-267195-A cited herewith, was previously cited in an IDS filed on Jul. 15, 2020.*.

Russian Office Action dated Feb. 15, 2021 for corresponding Russian Patent Application No. 2020125431, with English Translation, 12 pages. *Please note WO-2015/166973-A, US-2003/0198850-A1 and JP-2005-267195-A cited herewith, were previously cited in an IDS filed Jul. 15, 2020.*.

* cited by examiner

FIG. 2

| AREA | SHOP | SALES |
|---|---|---|
| Tokyo | | |
| | SubTotal | |
| Kanagawa | | |
| | SubTotal | |
| Chiba | | |
| | SubTotal | |
| Saitama | | |
| | SubTotal | |
| Total | | |

FIG. 3

[INFORMATION REGARDING ASSOCIATION BETWEEN CELL AND XBRL ELEMENT]
COLUMN A: IN A CASE OF AREA ⇒ VALUE OF Area
    IN A CASE OF TOTAL ⇒ VALUE OF Level (Total)
COLUMN B: IN A CASE OF SHOP ⇒ VALUE OF Shop
    IN A CASE OF SUBTOTAL ⇒ VALUE OF Level (Total)
COLMN C: VALUE OF <Sales> ELEMENT

[HIERARCHICAL STRUCTURE OF Y-AXIS HEADER]
```
<root> -+- "Tokyo" -+- SHOP [REPETITION]
        |           |
        |           +- "SubTotal"
        |
        ===
        |
        +- "Saitama" -+- SHOP [REPETITION]
        |             |
        |             +- "SubTotal"
        |
        +- "Total"
```

FIG. 4

| AREA | SHOP | SALES |
|---|---|---|
| Tokyo | Shinjyuku | 100 |
| | Ikebukuro | 120 |
| | Shibuya | 140 |
| | Kamata | 160 |
| | Ueno | 180 |
| | SubTotal | 700 |
| Kanagawa | Kawasaki | 200 |
| | Yokohama | 220 |
| | Atsugi | 240 |
| | Fujisawa | 260 |
| | SubTotal | 1,620 |
| Chiba | Funabashi | 300 |
| | Urayasu | 320 |
| | Makuhari | 340 |
| | SubTotal | 960 |
| Saitama | Ohmiya | 400 |
| | Urawa | 420 |
| | SubTotal | 820 |
| Total | | 4,100 |

FIG. 5

| AREA | SHOP | SALES |
|---|---|---|
| Tokyo | Shibuya | 100 |
| | SubTotal | 100 |
| Saitama | Ohmiya | 200 |
| | SubTotal | 200 |
| Total | | 300 |

24

DELETE BLOCK a1

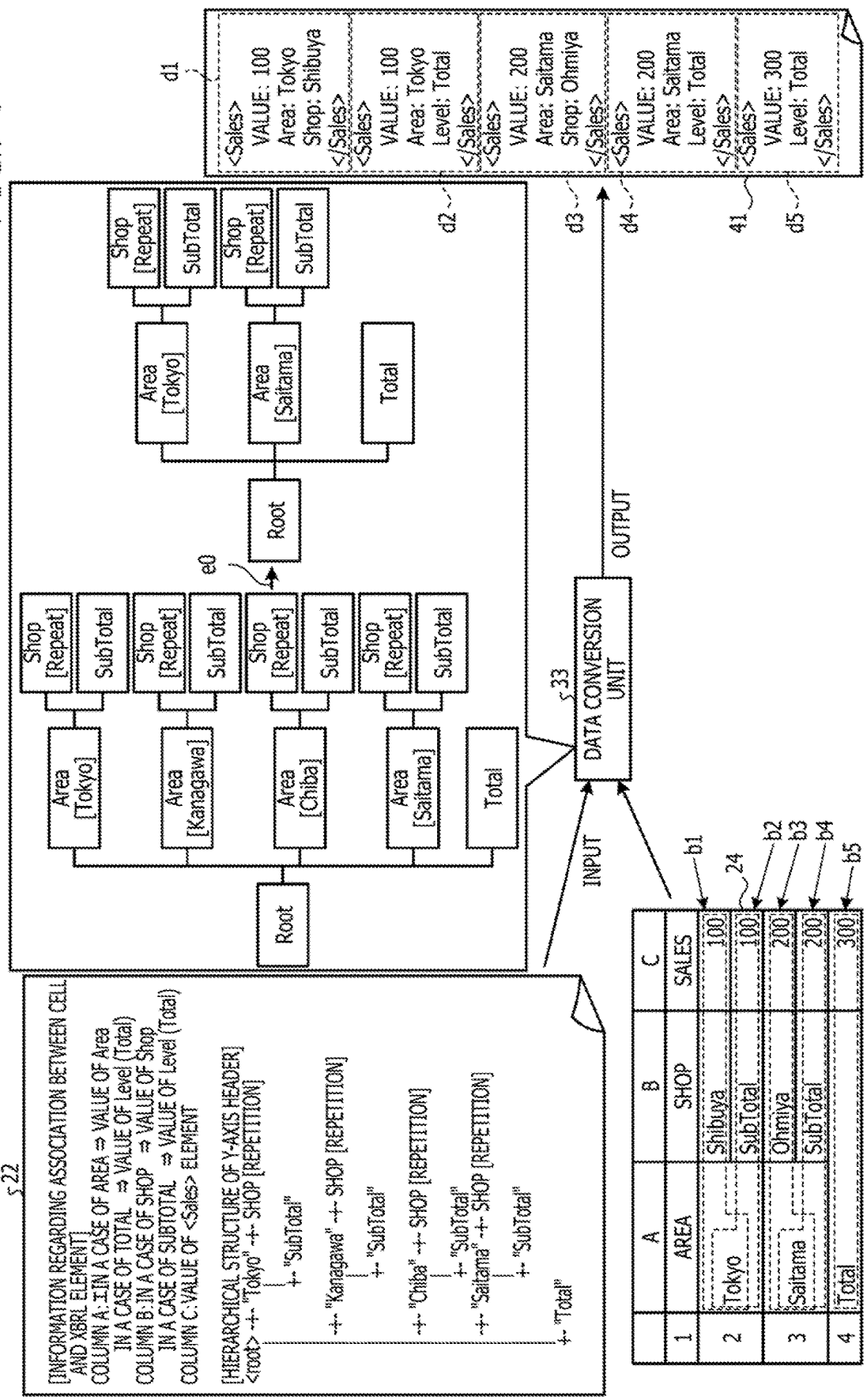

FIG. 12A

| SALES LIST | | |
|---|---|---|
| AREA | SHOP | SALES |
| Tokyo | Shinjyuku | 100 |
| | Ikebukuro | 120 |
| | Shibuya | 140 |
| | Kamata | 160 |
| | Ueno | 180 |
| | SubTotal | 700 |
| Kanagawa | Kawasaki | 200 |
| | Yokohama | 220 |
| | Atsugi | 240 |
| | Fujisawa | 260 |
| | SubTotal | 1,620 |
| Chiba | Funabashi | 300 |
| | Urayasu | 320 |
| | Makuhari | 340 |
| | SubTotal | 960 |
| Saitama | Ohmiya | 400 |
| | Urawa | 420 |
| | SubTotal | 820 |
| All | Total | 4,100 |

XML INSTANCE

```
<Sales area="Tokyo" shop="Shinjuku">100</>
<Sales area="Tokyo" shop="Ikebukuro">120</>
: :
<Sales area="Tokyo" shop="SubTotal">700</>
: :
<Sales area="Saitama" shop="Ohmiya">400</>
<Sales area="Saitama" shop="Urawa">420</>
<Sales area="Saitama" shop="SubTotal">820</>
<Sales area="All" shop="Total">4100</>
```

SALES LIST

| AREA | SHOP | SALES |
|---|---|---|
| Tokyo | Shinjyuku | 100 |
| | SubTotal | 100 |
| Saitama | Ohmiya | 200 |
| | SubTotal | 200 |
| All | Total | 300 |

XML INSTANCE

```
<Sales area="Tokyo" shop="Shinjuku">100</>
<Sales area="Tokyo" shop="SubTotal">100</>
<Sales area="Saitama" shop="Ohmiya">200</>
<Sales area="Saitama" shop="SubTotal">200</>
<Sales area="All" shop="Total">300</>
```

FIG. 12C

SALES LIST (BREAKDOWN TABLE)

| AREA | SHOP | SALES |
|---|---|---|
| Tokyo | Shinjyuku | 100 |
| | Ikebukuro | 120 |
| | Shibuya | 140 |
| | Kamata | 160 |
| | Ueno | 180 |
| Kanagawa | Kawasaki | 200 |
| | Yokohama | 220 |
| | Atsugi | 240 |
| | Fujisawa | 260 |
| Chiba | Funabashi | 300 |
| | Urayasu | 320 |
| | Makuhari | 340 |
| Saitama | Ohmiya | 400 |
| | Urawa | 420 |

XBRL INSTANCE

```
<Sales>
 VALUE: 100
 Area:Tokyo
 Shop:Shinjuku
</Sales>
...
<Sales>
 VALUE: 420
 Area: Saitama
 Shop: Urawa
</Sales>
<Sales>
 VALUE:700
 Area:Tokyo
 Level: Total
</Sales>
...
<Sales>
 VALUE: 420
 Level: Total
</Sales>
```

SALES LIST (TOTAL TABLE)

| AREA | LEVEL | SALES |
|---|---|---|
| Tokyo | Total | 700 |
| Kanagawa | Total | 1,620 |
| Chiba | Total | 960 |
| Saitama | Total | 820 |
| (omit) | | 4,100 |

COMPUTER-READABLE RECORDING MEDIUM RECORDING SPECIFYING PROGRAM, INFORMATION PROCESSING APPARATUS, AND SPECIFYING METHOD

CROSS-REFERENCE TO RELATED APPLICATION

This application is a continuation application of International Application PCT/JP2018/003282 filed on Jan. 31, 2018 and designated the U.S., the entire contents of which are incorporated herein by reference.

FIELD

The embodiment relates to a specifying program or the like.

BACKGROUND

Financial statements using eXtensible Business Reporting Language (XBRL) are obliged to submit to the Financial Service Agency. XBRL is an eXtensible Markup Language (XML) based language developed as a data description language used to easily prepare, distribute, and use business reports.

Related art is disclosed in International Publication Pamphlet No. WO 2017/199309.

SUMMARY

According to an aspect of the embodiments, a non-transitory computer-readable recording medium records a specifying program for causing a computer to execute processing including: receiving a first file; acquiring information indicating a correspondence relationship between an item included in the first file and an item included in a second file having a format different from format of the first file; acquiring an item value associated with identification information of the received first file with reference to a storage that stores an item value associated with a specific item included in a file in association with the identification information of the file; comparing the item value associated with the specific item among the items included in the received first file with the acquired item value; and specifying a target item associated with an item value associated with a second item included in the received first file among items included in the second file on the basis of the comparison result and the acquired information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a template sheet according to the embodiment.

FIG. 3 is a diagram illustrating an example of a mapping definition according to the embodiment.

FIG. 4 is a diagram illustrating an example of an input-completed sheet according to the embodiment.

FIG. 5 is a diagram illustrating another example of the input-completed sheet according to the embodiment.

FIG. 7 is a diagram illustrating an image of data conversion processing according to the embodiment.

FIG. 12A is a diagram illustrating a reference example of a table indicating an input-completed sheet obtained by making an input to a template sheet.

FIG. 12C is a diagram illustrating a reference example of the table indicating the input-completed sheet obtained by making an input to the template sheet.

DESCRIPTION OF EMBODIMENTS

The data of the financial statements submitted to the supervisory authorities, such as the Financial Service Agency or the Tokyo Stock Exchange, is referred to as an instance. The instance is created on the basis of a definition body (called "taxonomy") that is opened to the public by the supervisory authorities. Taxonomy includes schemas, in each of which a name or type information of an XBRL element corresponding to an item is defined, and link bases, in each of which a relationship between the XBRLs is defined. The relationship between the XBRL elements corresponds to, for example, display order, an aggregation method, or the like, of items in the financial statements.

Figure 11:
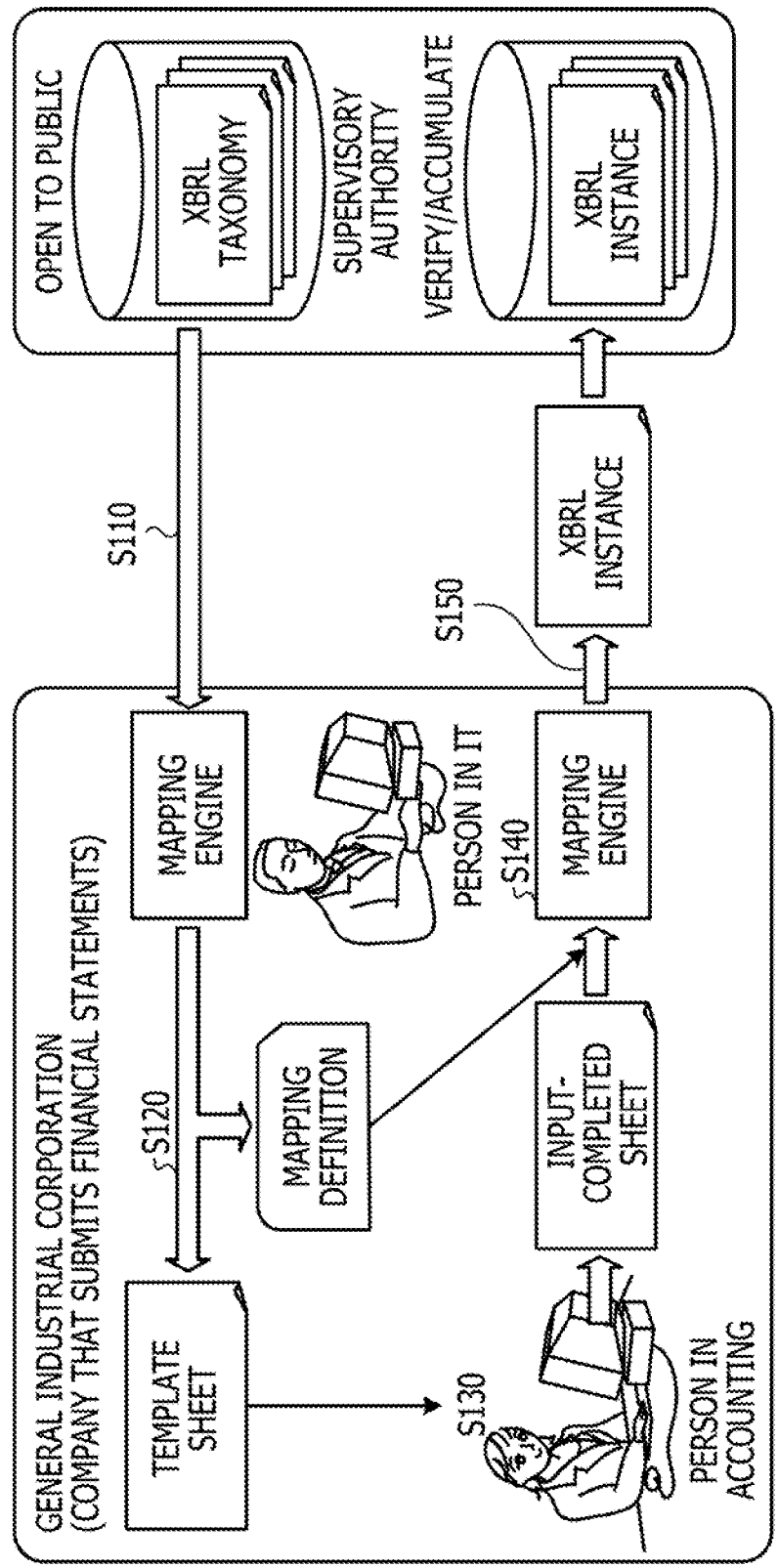
FIG. 11 is a diagram illustrating a reference example of a flow for creating an instance.

Here, a reference example of a flow for creating the instances as financial statements will be described with reference to FIG. 11. FIG. 11 is a diagram illustrating the reference example of the flow for creating the instance. In the supervisory authority, taxonomies described in the XBRL are stored and opened to the public. In a company that submits the financial statements, a mapping engine downloads a taxonomy opened to the public (S110) and generates a mapping definition and a template sheet on the basis of the taxonomy (S120). The template sheet indicates a table created by using spreadsheet software, such as Excel. The mapping definition indicates a definition in which position and size information of cells of a header portion or an input portion in the table is associated with property information of an XBRL element corresponding to the cell.

Then, a person in charge inputs financial data to the template sheet and creates an input-completed sheet (S130). The input-completed sheet is input to the mapping engine, and the mapping engine converts the input input-completed sheet into an instance by using the mapping definition (S140) and uploads the instance to the supervisory authority (S150). The supervisory authorities accumulate and verify the instances.

By the way, in recent years, there has been an increasing demand from the supervisory authorities and users to refine the financial reports. The refinement of the financial reports includes, for example, refinement from a company unit into a business office unit or refinement from an annual report to a monthly report. Furthermore, in response to the demand for the refinement of the financial reports, the international standard specification (table link base) used to describe a layout for XBRL data table display has been recommended. The table link base is used in a fixed length table, a variable length table, and a three-dimensional table in the taxonomy issued by the European public organizations. The financial reports in the future is expected to shift to the detailed financial reports using tables having different size and numbers for each company.

Figure 12B:
FIG. 12B is a diagram illustrating a reference example of the table indicating the input-completed sheet obtained by making an input to the template sheet.

FIGS. 12A, 12B, and 12C are diagrams illustrating reference examples of a table indicating an input-completed sheet obtained by making an input to a template sheet. Note that FIGS. 12A, 12B, and 12C illustrate, for example, a case where the Financial Services Agency makes a company that has shops in Kanto area submit electronic data of a sales list of the shops in Kanto area.

FIG. 12A is an input-completed sheet of a sales list of all shops, in Kanto area, of a company in a case where a size of the company is large. FIG. 12B is an input-completed sheet of a sales list of all shops, in Kanto area, of a company in a case where the size of the company is small. A mapping engine reads the sales list from the top to the bottom row by row for each input-completed sheet, extracts values of cells in the read row from the left to the right, and sets the value to a predetermined attribute value or element value so as to generate an XML instance.

FIG. 12C is a table in which the table of the sales list is divided into a breakdown table and a total table and is reproduced by using the table link base. It has been known that tables for a breakdown of an area and a total of an area are divided in the table link base.

Here, a technology has been known that determines a start position of a plurality of blocks included in the input-completed sheet when the input-completed sheet is converted into the instance. For example, an evaluation device compares a configuration (combination of character string and data type) of a cell acquired from the mapping definition and a configuration of a cell of a row of the input-completed sheet and evaluates the row to be compared according to the comparison result, for each row of the plurality of rows.

However, there is a problem in that there is a case where it is not possible to specify an item of an instance associated with an item value included in an input-completed sheet when the input-completed sheet is converted into the instance.

For example, the input-completed sheet is a sheet obtained by making an input to a template sheet. However, only addition of rows or columns to the template sheet is allowed. In other words, deletion of rows or columns is not allowed. Furthermore, the template sheet is simultaneously generated together with the mapping definition from the table link base. Therefore, when an unnecessary row is deleted from the template sheet, the mapping engine assumes the deletion as an error when the input-completed sheet obtained by making an input to the template sheet is converted into the instance by using the mapping definition. That is, this is because a one-to-one relationship between the input-completed sheet and the mapping definition is broken. Therefore, it is not possible to specify the item of the instance associated with the item value included in the input-completed sheet when the input-completed sheet is converted into the instance.

According to one aspect, accuracy for specifying an item of an instance associated with an item value included in an input-completed sheet when the input-completed sheet is converted into the instance may be enhanced.

Hereinafter, an embodiment of a specifying program, an information processing apparatus, and a specifying method disclosed in the present application will be described in detail with reference to the drawings. Note that the present invention is not limited to the embodiment.

[Embodiment]

[Configuration of Information Processing Apparatus According to Embodiment]

Figure 1:
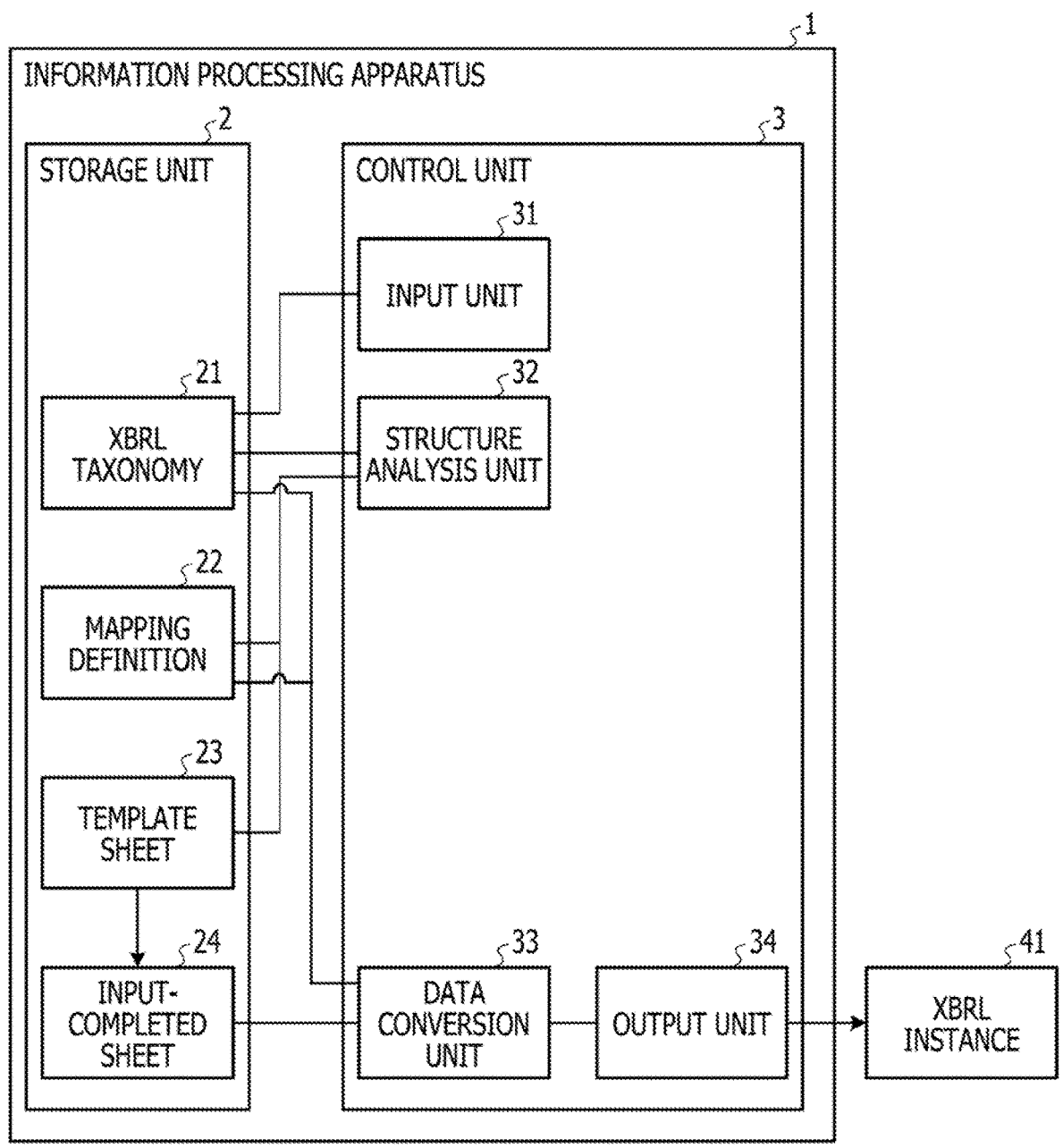
FIG. 1 is a functional block diagram illustrating a configuration of an information processing apparatus according to an embodiment.

FIG. 1 is a functional block diagram illustrating a configuration of an information processing apparatus according to an embodiment. As illustrated in FIG. 1, an information processing apparatus 1 converts data in a table format into an instance described in XBRL while absorbing a fluctuation in a layout of the data in the table format including a plurality of blocks. The instance here is referred to as "XBRL instance". The conversion here is synonymous with "mapping". The fluctuation in the layout here indicates a change in a layout of an initial display of data in a table format including a plurality of blocks. An example of the fluctuation in the layout is removal of one block from the layout of the initial display. However, the fluctuation in the layout is not limited to this. Another example of the fluctuation in the layout may be a change in a position of a block from that in the layout of the initial display.

The information processing apparatus 1 includes a storage unit 2 and a control unit 3.

The storage unit 2 corresponds to a storage device such as a non-volatile semiconductor memory element, for example, a Flash Memory, a Ferroelectric Random Access Memory (FRAM) (registered trademark), and the like. Then, the storage unit 2 includes an XBRL taxonomy 21, a mapping definition 22, a template sheet 23, and an input-completed sheet 24.

The XBRL taxonomy 21 is a definition of a system of XBRL elements and includes a schema, a link base, and a table link base. The schema is a dictionary that stores attribute information such as a name or a data type of the XBRL element and corresponds to an "item definition" in the embodiment. The link base is, for example, a document in which a parent-child relationship, a display order, a display name, or the like between the XBRL elements are described. The table link base is a document in which a table layout of the XBRL element is described and corresponds to a "table layout" in the embodiment.

The template sheet 23 is a general-purpose template sheet indicating an input form reproducing the financial statements. The template sheet 23 indicates a table created by spreadsheet software such as Excel. Note that the template sheet 23 is defined by using the table link base (table layout) and is generated by a structure analysis unit 32 described later. Furthermore, an example of content of the template sheet 23 will be described later.

The mapping definition 22 indicates a correspondence relationship between an item included in the template sheet 23 and an item included in an XBRL instance 41. For example, the mapping definition 22 defines data type combination information of a header (title) portion in the table indicated by the template sheet 23. In the mapping definition 22, for example, data type combinations of a header portion in an X axis and a header portion in a Y axis, and a header portion in an X axis, a header portion in the Y axis, and a header portion in a Z axis are defined. The data type includes, for example, a character string type, a date type, and a numerical value type. However, the data type is not limited to these. Furthermore, the mapping definition 22 defines association between the cell in the table indicated by the template sheet 23 and the XBRL element of the XBRL instance 41 and a hierarchical structure of a header in a case where the header has a hierarchy. In information regarding the association between the cell in the table and the XBRL element, a position of a column of a cell in a header portion or an input portion in the table and property information of the XBRL element corresponding to the cell are defined. In the hierarchical structure of the header, in a case where a first cell and a second cell in the header have a hierarchical structure, a character string in a column in the first cell and input content in an input portion and a character string of initial display of a column of the second cell are defined. Note that the mapping definition 22 is generated by the structure analysis unit 32 described later. Furthermore, an example of content of the mapping definition 22 is described later.

The input-completed sheet 24 is a sheet obtained by inputting the financial data to the template sheet 23. The input-completed sheet 24 is input by a user. The user is, for example, a person in charge of the company that submits the financial statements.

The control unit 3 includes an internal memory for storing a program prescribing various processing procedures and control data and executes various processing by using the stored programs and data. Then, the control unit 3 corresponds to, for example, an integrated circuit such as an Application Specific Integrated Circuit (ASIC) or a Field Programmable Gate Array (FPGA) or an electronic circuit such as a Central Processing Unit (CPU) or a Micro Processing Unit (MPU). Moreover, the control unit 3 includes an input unit 31, the structure analysis unit 32, a data conversion unit 33, and an output unit 34. Note that the data conversion unit 33 is an example of an acquisition unit, a specification unit, a determination unit, and an evaluation unit.

The input unit 31 inputs the XBRL taxonomy 21 and stores the input XBRL taxonomy 21 in the storage unit 2.

The structure analysis unit 32 analyzes the XBRL taxonomy 21 and generates the mapping definition 22 and the template sheet 23 according to the definition of the table link base (table layout). The structure analysis unit 32 stores the generated mapping definition 22 and template sheet 23 in the storage unit 2.

[Example of Template Sheet]

Figure 2:
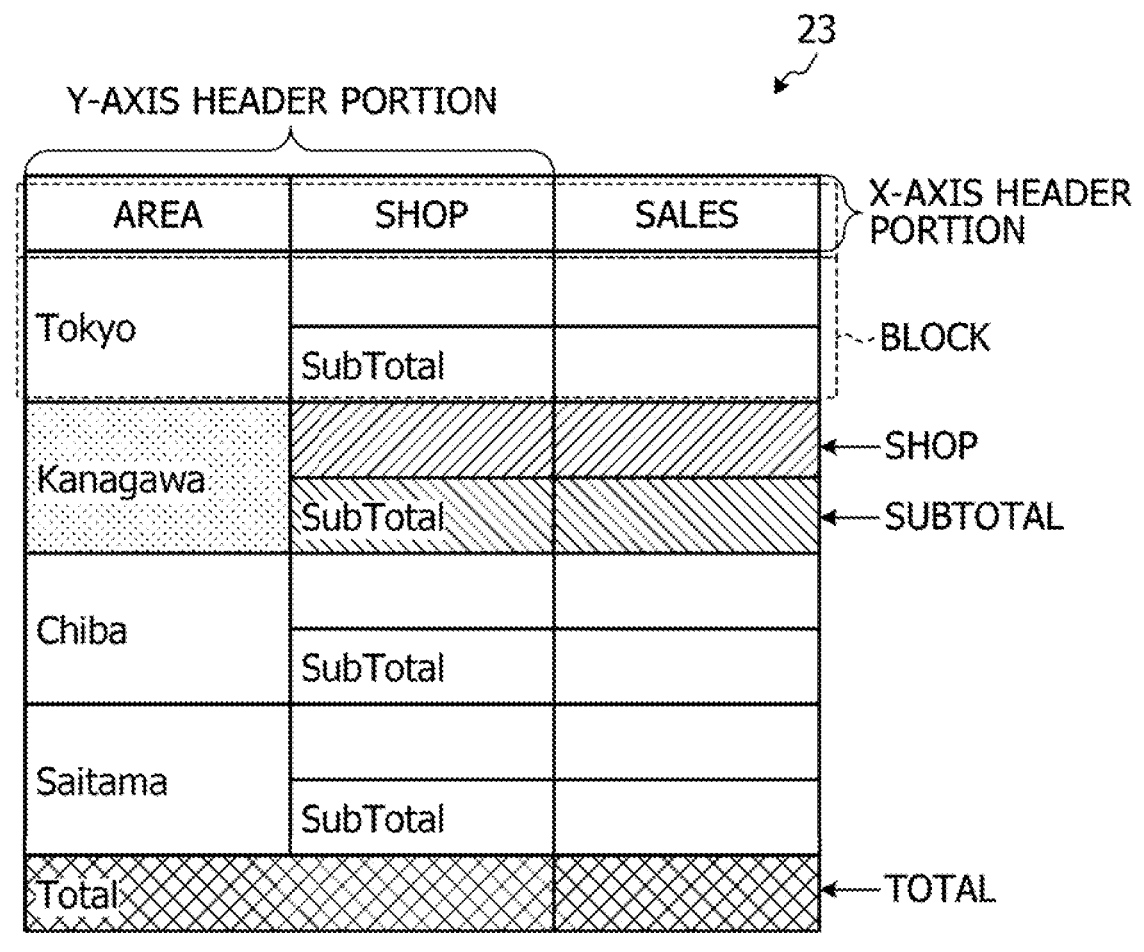

Here, an example of the template sheet 23 will be described with reference to FIG. 2. FIG. 2 is a diagram illustrating an example of a template sheet according to the embodiment. Note that it is assumed that the template sheet 23 described with reference to FIG. 2 be a template of a sales list of all shops of a certain company.

As illustrated in FIG. 2, the template sheet 23 induces title lines in a header portion in the Y axis and a header portion in the X axis. Furthermore, the template sheet 23 includes a plurality of blocks after the title line. That is, in the template sheet 23, a single table includes the title line and the plurality of blocks. In FIG. 2, in the template sheet 23, after the blocks corresponding to a plurality of areas, a total (Total) block is arranged in the final row. Note that arrangement order of the blocks is defined by the table layout of the XBRL taxonomy 21.

Furthermore, an AREA column and a SHOP column in the Y-axis header portion have a parent-child relationship and form a hierarchical structure. Note that a hierarchical structure of the Y-axis header portion is defined by the table layout of the XBRL taxonomy 21.

The block includes the AREA column, the SHOP column, and a SALES column. The AREA column indicates a name of an area (area name). In the AREA column, a fixed character string of each area name is set. Each area name and order of each area name are defined by the table layout of the XBRL taxonomy 21. In other words, each area name is set to the AREA column of each block in order of the layout in the table layout of the XBRL taxonomy 21. Furthermore, to the SHOP column, each shop name and a fixed character string "SubTotal" of subtotal are set. Each shop name is input by the user. The fixed character string "SubTotal" of the subtotal is defined by the table layout of the XBRL taxonomy 21. To the SALES column, a value of sales of each shop and a value of the subtotal in the block are input by the user. Note that the shop name in the SHOP column in the block is added by the user as necessary. The shop name is an optional character string. The subtotal is positioned in the final row of the block.

The last block includes a combined cell of the AREA column and the SHOP column and a cell of the SALES column. In the combined cell, a fixed character string "Total" of a total is set. The fixed character string "Total" of the total is defined by the table layout of the XBRL taxonomy 21. To the cell in the SALES column, a total value of the shops in all the blocks is input by the user.

Furthermore, each data type is set for each cell of the template sheet 23. The data type of each cell is defined by the item definition of the XBRL taxonomy 21.

[Example of Mapping Definition]

FIG. 3 is a diagram illustrating an example of a mapping definition according to the embodiment. Note that it is assumed that the mapping definition 22 described with reference to FIG. 3 be a definition regarding mapping of a sales list of all shops of a certain company. As illustrated in FIG. 3, the mapping definition 22 includes information regarding association between the cell and the XBRL element. The following information is described in the information regarding the association between the cell and the XBRL element. In a case of an area, a cell in which a value is set or input to a column A is associated with a value of <Area> property of <Sales> element indicating the XBRL element. Furthermore, in a case of the total, the cell is associated with a value "Total" of <Level> property of <Sales> element indicating the XBRL element. In a case of shop, a cell in which a value is set or input to a column B is associated with a value of <Shop> property of <Sales> element indicating the XBRL element. Furthermore, in a case of subtotal, the cell is associated with a value "Total" of <Level> property of <Sales> element indicating the XBRL element. A cell in which a value is input to a column C is associated with a value of <Sales> element indicating the XBRL element.

Furthermore, the mapping definition 22 further includes information regarding a hierarchical structure of the Y-axis header. In other words, hierarchical structures of the AREA column and the SHOP column in the Y-axis header portion are defined. If the value of the AREA column in the Y-axis header is "Tokyo", the shop in the SHOP column of the Y-axis header portion is repeated, and the fixed character string "SubTotal" of the subtotal is set to the final row of the "Tokyo" block. Furthermore, in a case where the value of the AREA column in the Y-axis header portion is "Saitama", the shop in the SHOP column in the Y-axis header portion is repeated, and the fixed character string "SubTotal" of the subtotal is set to the final row of the "Saitama" block. Then, in a case where the value of the AREA column in the Y-axis header portion is "Total", all the blocks are completed.

Note that, although not illustrated, the mapping definition 22 further includes data type combination information. For example, a data type combination of the X-axis header portion is set to the data type combination information. A data type combination of the Y-axis header portion is set to the data type combination information. Combination information of the value cell portion to which a value is input is set to the data type combination information. For example, "character string type, character string type" is set as the data type combination of the Y-axis header portion. The "numerical value type" is set as the data type combination of the X-axis header portion.

[Example of Input-Completed Sheet]

FIG. 4 is a diagram illustrating an example of an input-completed sheet according to the embodiment. The input-completed sheet 24 illustrated in FIG. 4 indicates a result obtained by inputting financial data to the template sheet 23 illustrated in FIG. 2 by the user. The input-completed sheet 24 includes the plurality of blocks. The input-completed sheet 24 in FIG. 4 indicates a case where the arrangement order of the plurality of blocks is not changed from that in an initial state of the template sheet 23. In other words, a case is indicated where the arrangement order of the plurality of blocks is the same as that in the definition by the table layout of the XBRL taxonomy 21.

In the final row of each block, the character string of "SubTotal" is initially set in the "SHOP" column. Then, in the last block, the character string of "Total" is initially set in the combined cell of the AREA column and the SHOP column. Note that "SubTotal" and "Total" are initially set to the template sheet 23. Here, five blocks are illustrated, and a "Tokyo" block, a "Kanagawa" block, a "Chiba" block, a "Saitama" block, and a "Total" block are illustrated. In FIG. 4, the number of shop names in the SHOP column of each block is plural. However, the number of shop names may be one or two, and the number of shop names is not limited. In a case where the number of shop names is zero, the shop name may be set to be blank.

[Another Example of Input-Completed Sheet]

FIG. 5 is a diagram illustrating another example of the input-completed sheet according to the embodiment. The input-completed sheet 24 illustrated in FIG. 5 indicates a result obtained by inputting financial data to the template sheet 23 illustrated in FIG. 2 by the user, and this is the same as the input-completed sheet 24 illustrated in FIG. 4. The input-completed sheet 24 in FIG. 5 is different from the input-completed sheet 24 in FIG. 4 in that the arrangement order of the plurality of blocks in the input-completed sheet 24 in FIG. 5 is changed from the initial state of the template sheet 23. In other words, the above is a case where the arrangement order of the plurality of blocks is different from that in the definition by the table layout of the XBRL taxonomy 21. In the input-completed sheet 24 in FIG. 5, as indicated by a reference al, a case is illustrated where a block between a block in which "Tokyo" is included in the AREA column and a block of "Saitama" is deleted. The block is deleted, for example, because the user has deleted an unnecessary block.

When the block is deleted in this way, the mapping engine assumes the deletion as an error when the input-completed sheet 24 is converted into the XBRL instance 41 by using the mapping definition 22. This is because the template sheet 23 before being input to the input-completed sheet 24 and the mapping definition 22 are simultaneously generated from the table link base of the XBRL taxonomy 21. The mapping engine sequentially executes mapping processing downward from a first row of the input-completed sheet 24. Therefore, when the block is deleted, the mapping engine assumes the deletion as an error because a target character string of a block next to the deleted block does not completely coincide with a target character string of the mapping definition 22. That is, this is because a one-to-one relationship between the template sheet 23 and the mapping definition 22 is broken. Therefore, a case where the data conversion unit 33 below executes the following processing when converting the input-completed sheet 24 into the XBRL instance 41 by using the mapping definition 22 will be described. In other words, in a case where a specific fixed character string in a block to be converted is different from the corresponding character string of the hierarchical structure of the Y-axis header in the mapping definition 22, the data conversion unit 33 performs comparison with a character string subsequent to the corresponding character string.

Returning to FIG. 1, the data conversion unit 33 receives the input-completed sheet 24 and acquires the mapping definition 22 on a memory.

Furthermore, the data conversion unit 33 acquires an item value associated with identification information of the received input-completed sheet 24 with reference to the mapping definition 22. For example, the data conversion unit 33 acquires a character string associated with an AREA item in the Y-axis header of the template sheet 23 that is simultaneously generated with the mapping definition 22, from the hierarchical structure of the Y-axis header in the mapping definition 22. Furthermore, the data conversion unit 33 acquires a character string associated with an AREA item in the next order from the hierarchical structure of the Y-axis header when receiving a notification indicating that the character strings do not coincide with each other according to the comparison processing.

Furthermore, the data conversion unit 33 compares an item value associated with a specific item with an item value acquired with reference to the mapping definition 22 from among the items included in the received input-completed sheet 24. For example, the data conversion unit 33 compares the fixed character string associated with the AREA item included in the input-completed sheet 24 with the character string acquired from the hierarchical structure of the Y-axis header in the mapping definition 22. In a case where the fixed character string of the input-completed sheet 24 does not coincide with the character string of the hierarchical structure of the Y-axis header, the data conversion unit 33 notifies that the character strings do not coincide with each other of the acquisition processing.

Furthermore, the data conversion unit 33 specifies a target item associated with an item value associated with a second item included the received input-completed sheet 24 from among the items included in the XBRL instance 41 on the basis of the comparison result and the mapping definition 22. For example, in a case where the fixed character string of the input-completed sheet 24 coincides with the character string of the hierarchical structure of the Y-axis header, the data conversion unit 33 executes the following processing. Regarding the row of the fixed character string of the input-completed sheet 24, the data conversion unit 33 specifies a target item associated with a character string associated with a SHOP item included in the row from among the items included in the XBRL instance 41 on the basis of the mapping definition 22. In other words, the data conversion unit 33 maps a row of the fixed character string of the input-completed sheet 24 with the XBRL instance 41.

Furthermore, the data conversion unit 33 updates the hierarchical structure of the Y-axis header in the mapping definition 22 on a memory. For example, in a case where the fixed character string of the input-completed sheet 24 does not coincide with the character string of the hierarchical structure of the Y-axis header, the data conversion unit 33 deletes the hierarchical structure corresponding to the character string, which does not coincide, from the hierarchical structure of the Y-axis header. With this deletion, the data conversion unit 33 can accelerate next data conversion processing of the company, which submits the financial statements, using the input-completed sheet 24 by updating the hierarchical structure of the Y-axis header in the mapping definition 22.

The output unit 34 outputs the XBRL instance 41 that indicates the result of the conversion by the data conversion unit 33. For example, the output unit 34 may output the XBRL instance 41 that is the conversion result to a monitor or may store the XBRL instance 41 in the storage unit 2.

[Image of Structure Analysis Processing]

Figure 6:
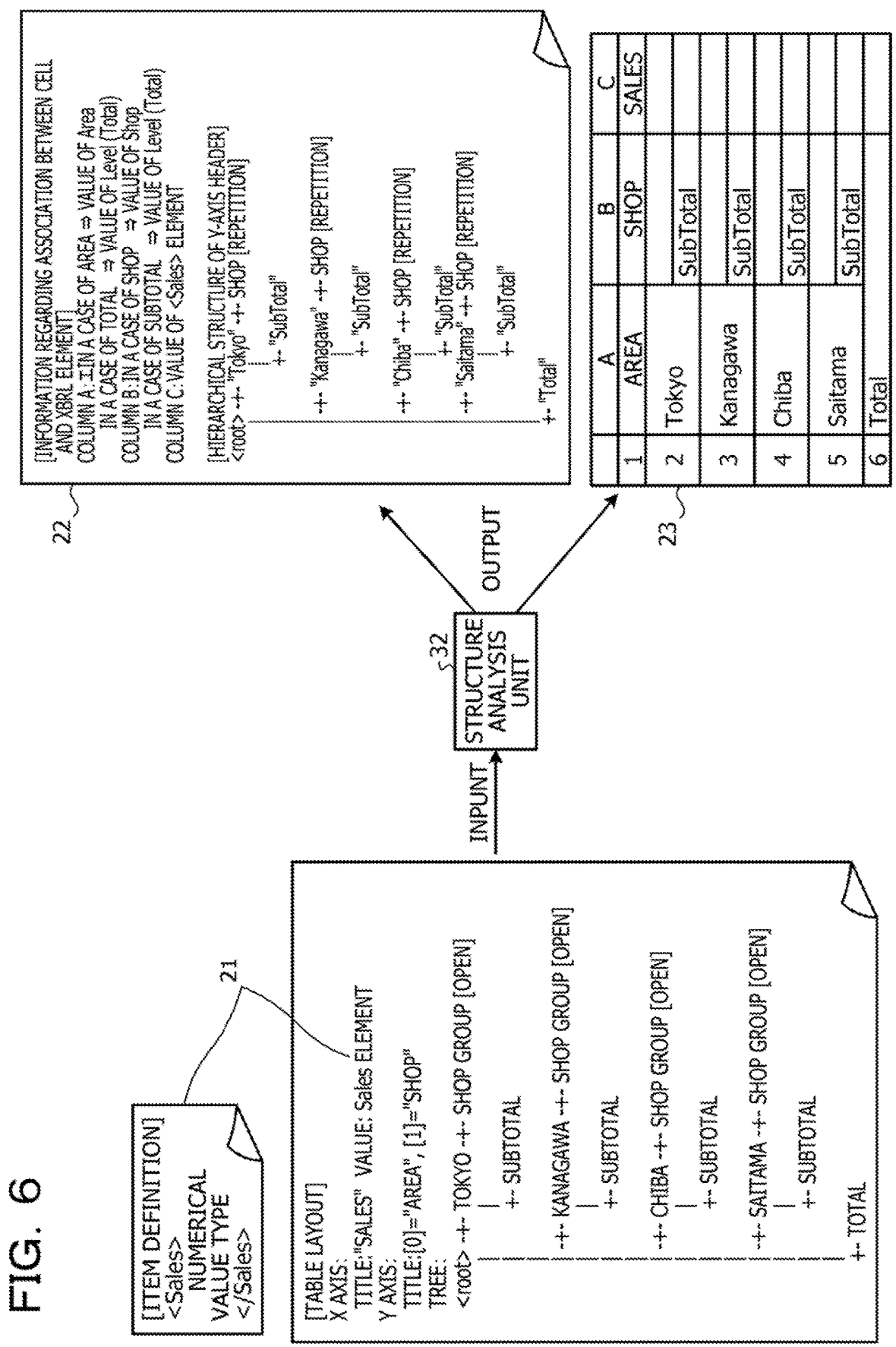
FIG. 6 is a diagram illustrating an image of structure analysis processing according to the embodiment.

Here, an image of structure analysis processing according to the embodiment will be described with reference to FIG. 6. FIG. 6 is a diagram illustrating the image of the structure analysis processing according to the embodiment. As illustrated in FIG. 6, the structure analysis unit 32 inputs the XBRL taxonomy 21. Then, the structure analysis unit 32 analyzes the input XBRL taxonomy 21 and generates and outputs the mapping definition 22 and the template sheet 23.

For example, the structure analysis unit 32 acquires a layout (arrangement order) of the header portions and the value cell portions in the X and Y axes from the table layout of the XBRL taxonomy 21. The structure analysis unit 32 acquires the information regarding the header portions in the X and Y axes and the data type of the value cell portion from the table layout of the XBRL taxonomy 21. The information regarding the header portions in the X and Y axes includes the character string of the title and the data type of the value. Here, the title is "SALES" in the X axis. Then, the data type of the value of the Sales element indicates the numerical value type. Note that the data type of the XBRL element is acquired from the item definition. Furthermore, in the Y axis, values of "AREA" and "SHOP" are arranged in this order as titles. Then, the layout (arrangement order) of the AREA column and the SHOP column is acquired from a tree.

Then, the structure analysis unit 32 sets the information regarding the XBRL element corresponding to each cell of the template sheet 23 as the information regarding the association between the cell of the mapping definition 22 and the XBRL element. The structure analysis unit 32 sets the hierarchical structure of the Y-axis header portion according to the analyzed layout (arrangement order). Here, in the Y-axis header portion, a hierarchy of "Tokyo", a hierarchy of "Kanagawa", a hierarchy of "Chiba", and a hierarchy of "Saitama" are set in the AREA column according to the arrangement order of the table layout. In a case where AREA is "Tokyo", the shop is repeated as SHOP, and "Subtotal" is set as the subtotal at the end. Similarly, in a case where AREA is "Kanagawa", the shop is repeated as SHOP, and "Subtotal" as the subtotal is set at the end. Similarly, in a case where AREA is "Chiba", the shop is repeated as SHOP, and "Subtotal" as the subtotal is set at the end. Similarly, in a case where AREA s "Saitama", the shop is repeated as SHOP, and "Subtotal" as the subtotal is set at the end. Then, in a case where AREA is "Total", the hierarchical structure of the Y-axis header portion ends.

Then, the structure analysis unit 32 generates the template sheet 23 according to the analyzed layout (arrangement order) and outputs the generated template sheet 23. Here, in the template sheet 23, a block of "Tokyo", a block of "Kanagawa", a block of "Chiba", and a block of "Saitama" are set according to the arrangement order of the table layout.

[Image of Data Conversion Processing]

Here, an image of data conversion processing according to the embodiment will be described with reference to FIG. 7. FIG. 7 is a diagram illustrating an image of the data conversion processing according to the embodiment. Note that, in FIG. 7, the block of "Kanagawa" and the block of "Chiba" are deleted from the blocks included in the input-completed sheet 24. As illustrated in FIG. 7, the data conversion unit 33 executes the following processing when converting the input-completed sheet 24 into the XBRL instance 41 by using the mapping definition 22. In a case where a specific fixed character string in a block to be converted is different from the corresponding character string of the hierarchical structure of the Y-axis header in the mapping definition 22, the data conversion unit 33 performs comparison with a character string subsequent to the corresponding character string.

For example, when receiving the input-completed sheet 24, the data conversion unit 33 acquires "Tokyo" from the hierarchical structure of the Y-axis header in the mapping definition 22. The acquired "Tokyo" is a character string associated with the AREA item of the template sheet 23 that is generated simultaneously with the mapping definition 22.

Then, the data conversion unit 33 acquires the fixed character string "Tokyo" associated with the AREA item included in the input-completed sheet 24. The data conversion unit 33 compares the acquired fixed character string "Tokyo" with the character string acquired from the mapping definition 22. Here, since the character string acquired from the mapping definition 22 is "Tokyo", the comparison result indicates that the character strings coincide with each other.

Then, regarding the row of the fixed character string "Tokyo" of the input-completed sheet 24, the data conversion unit 33 specifies a target item associated with a character string associated with a SHOP item included in the row from among the items included in the XBRL instance 41 on the basis of the mapping definition 22.

As an example, in a case where a character string associated with the SHOP item is "Shibuya", the data conversion unit 33 determines that the character string indicates a shop on the basis of the mapping definition 22. This is because the character string associated with the SHOP item is not "SubTotal". Then, since "Shibuya" indicates a case of the shop, the data conversion unit 33 specifies the item "Shop" included in the XBRL instance 41. Then, the data conversion unit 33 maps a row b1 of the fixed character string "Tokyo" of the input-completed sheet 24 as a reference d1 of the XBRL instance 41.

Furthermore, in a case where the character string associated with the SHOP item is "SubTotal", the data conversion unit 33 determines that the character string indicates a subtotal on the basis of the mapping definition 22. This is because the character string associated with the SHOP item is "SubTotal". Then, since "SubTotal" indicates a case of the subtotal, the data conversion unit 33 specifies an item "Level" included in the XBRL instance 41. Then, the data conversion unit 33 maps a row b2 of the fixed character string "Tokyo" of the input-completed sheet 24 as a reference d2 of the XBRL instance 41.

Next, the data conversion unit 33 acquires the fixed character string "Saitama" associated with the AREA item included in the input-completed sheet 24. The data conversion unit 33 compares the acquired fixed character string "Saitama" with the character string acquired from the mapping definition 22. Here, since the character string acquired from the mapping definition 22 is "Kanagawa" in the next row, the comparison result indicates Inconsistency.

Then, the data conversion unit 33 compares the acquired fixed character string "Saitama" with a character string acquired from the mapping definition 22 next. Here, since the character string acquired from the mapping definition 22 is next "Chiba", the comparison result indicates inconsistency.

Then, the data conversion unit 33 compares the acquired fixed character string "Saitama" with a character string acquired from the mapping definition 22 next. Here, since the character string acquired from the mapping definition 22 is next "Saitama", the comparison result indicates consistency.

Then, regarding the row of the fixed character string "Saitama" of the input-completed sheet 24, the data conversion unit 33 specifies a target item associated with a character string associated with a SHOP item included in the row from among the items included in the XBRL instance 41 on the basis of the mapping definition 22.

As an example, in a case where the character string associated with the SHOP item is "Ohmiya", the data conversion unit 33 determines that the character string indicates the shop on the basis of the mapping definition 22. This is because the character string associated with the SHOP item is not "SubTotal". Then, since "Ohmiya" indicates a case of the shop, the data conversion unit 33 specifies the item "Shop" included in the XBRL instance 41. Then, the data conversion unit 33 maps a row b3 of the fixed character string "Ohmiya" of the input-completed sheet 24 as a reference d3 of the XBRL instance 41.

Furthermore, in a case where the character string associated with the SHOP item is "SubTotal", it is sufficient that the data conversion unit 33 execute processing similarly to the row of "Tokyo". As a result, the data conversion unit 33 maps a row b4 of the fixed character string "Saitama" of the input-completed sheet 24 as a reference d4 of the XBRL instance 41.

Next, the data conversion unit 33 acquires the fixed character string "Total" associated with the AREA item included in the input-completed sheet 24. The data conversion unit 33 compares the acquired fixed character string "Total" with the character string acquired from the mapping definition 22. Here, since the character string acquired from the mapping definition 22 is "Total" next, the comparison result indicates consistency.

Then, regarding the row of the fixed character string "Total" of the input-completed sheet 24, the data conversion unit 33 specifies a target item associated with a character string associated with a SHOP item included in the row from among the items included in the XBRL instance 41 on the basis of the mapping definition 22.

As an example, in a case where the fixed character string associated with the AREA item is "Total", the data conversion unit 33 determines that the character string indicates the total on the basis of the mapping definition 22. Then, the data conversion unit 33 specifies the item "Level" included in the XBRL instance 41. Then, the data conversion unit 33 maps a row b5 of the fixed character string "Total" of the input-completed sheet 24 as a reference d5 of the XBRL instance 41.

Then, the data conversion unit 33 updates the hierarchical structure of the Y-axis header in the mapping definition 22 on the memory. Here, since the blocks of "Kanagawa" and "Chiba" are deleted from the input-completed sheet 24, the data conversion unit 33 makes an update so as to delete the hierarchical structures of "Kanagawa" and "Chiba" from the hierarchical structure of the Y-axis header in the mapping definition 22 as indicated by a reference e0.

In this way, even when an unnecessary block is deleted from the blocks included in the input-completed sheet 24, the data conversion unit 33 can specify an item associated with the item value included in the input-completed sheet 24 when the input-completed sheet 24 is converted into the XBRL instance 41. As a result, the data conversion unit 33 can enhance accuracy of mapping on the input-completed sheet 24 and the XBRL instance 41.

[Flowchart of Data Conversion Processing]

Figure 8A:
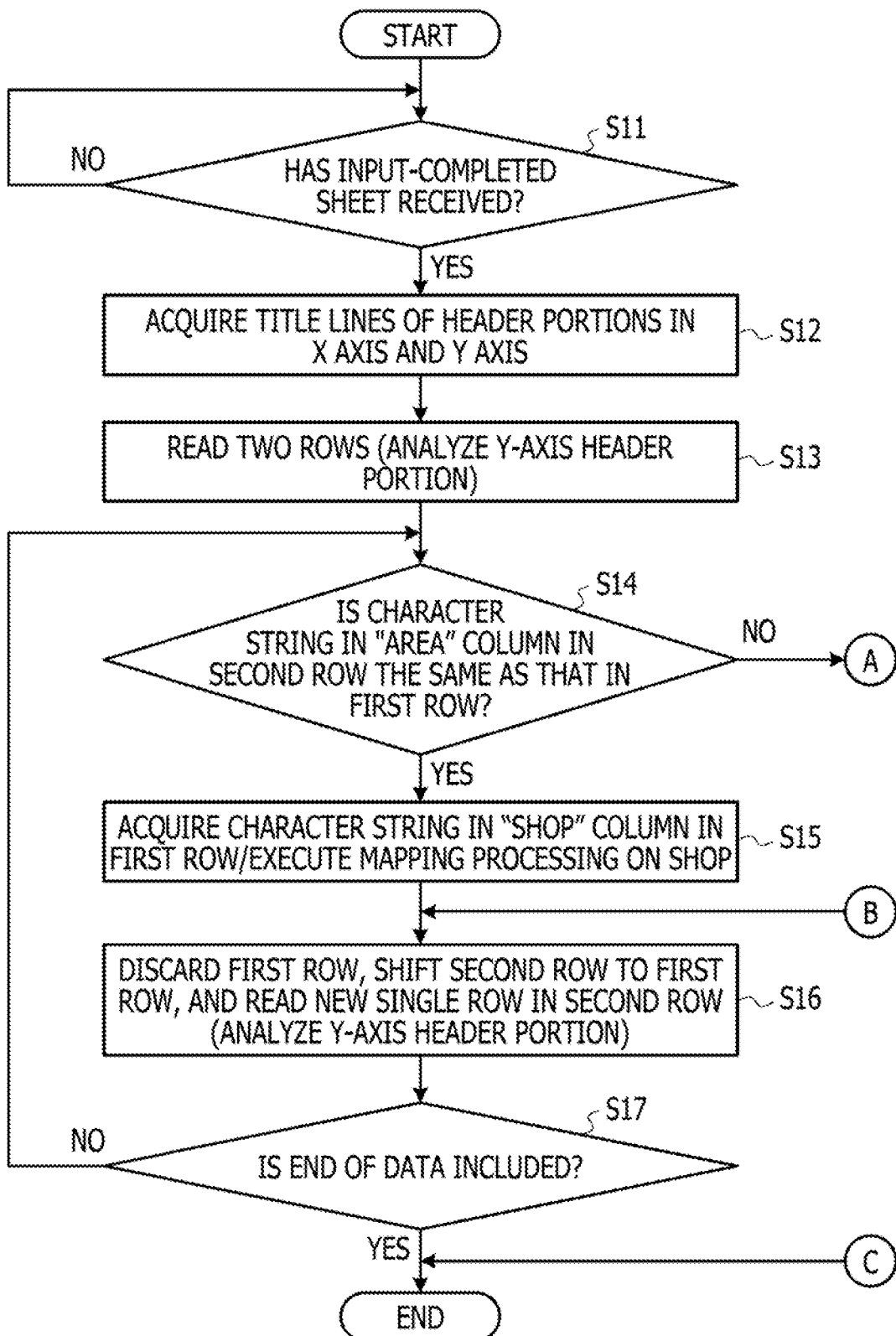
FIGS. 8A and 8B are a diagram illustrating an example of a flowchart of the data conversion processing according to the embodiment.
Figure 8B:
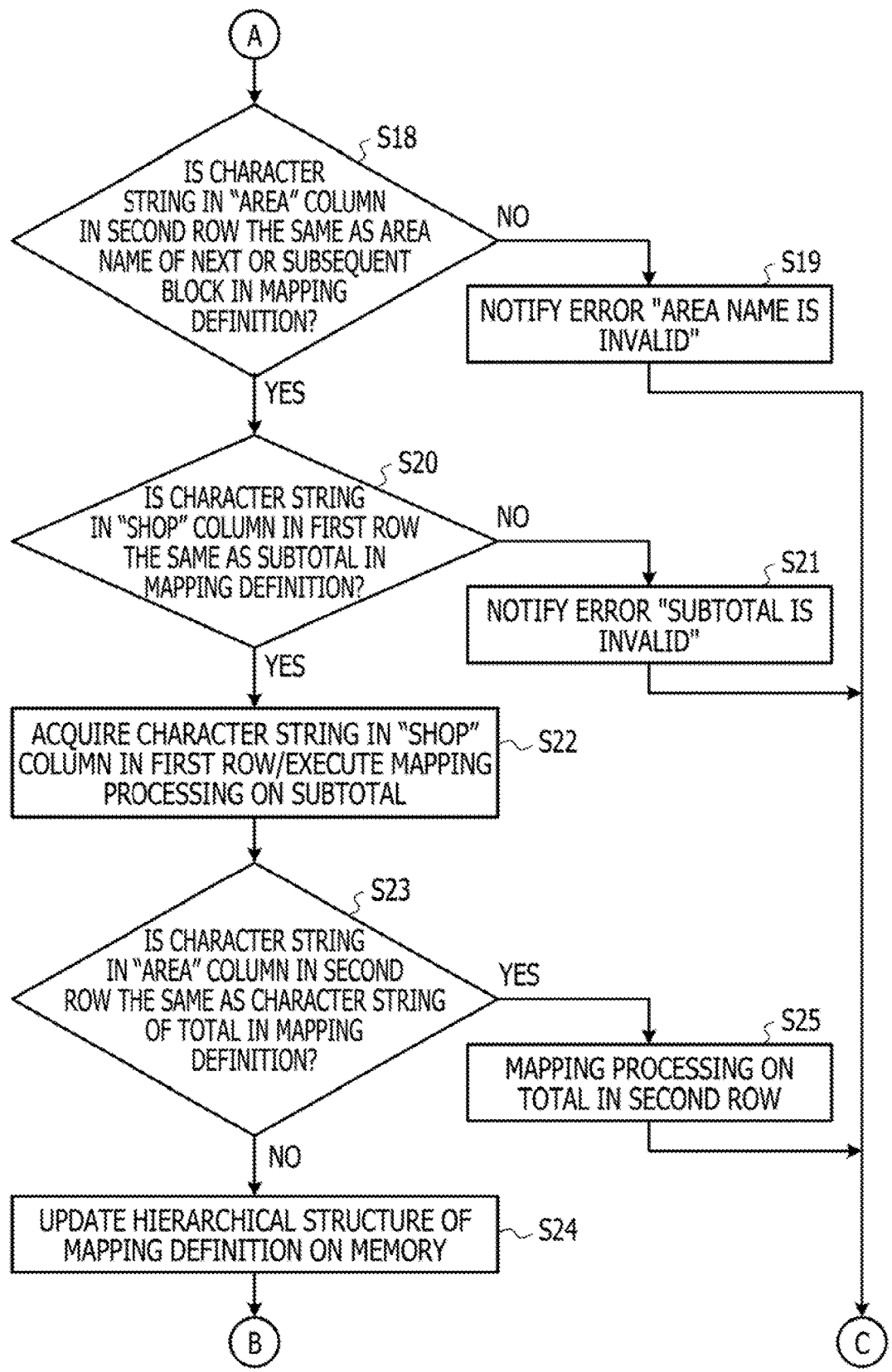

Next, a flowchart of the data conversion processing according to the embodiment will be described with reference to FIGS. 8A and 8O. FIGS. 8A and 8B are a diagram illustrating an example of the flowchart of the data conversion processing according to the embodiment. Note that it is assumed that the input-completed sheet 24 be input to the template sheet 23 illustrated in FIG. 2.

First, the data conversion unit 33 determines whether or not the input-completed sheet 24 is received (step S11). In a case where it is determined that the input-completed sheet 24 is not received (step S11; No), the data conversion unit 33 repeats the determination processing until the input-completed sheet 24 is received.

In a case where it is determined that the input-completed sheet 24 is received (step S11; Yes), the data conversion unit 33 acquires title lines of the header portions in the X and Y axes (step S12). The data conversion unit 33 reads two rows after the header portion as analysis target rows (step S13).

Then, the data conversion unit 33 determines whether or not a character string in the AREA" column in the second row is the same as that in the first row (step S14). In a case where it is determined that the character strings are the same (step S14; Yes), the data conversion unit 33 acquires a character string of the shop in the "SHOP" column in the first row and executes mapping processing on the shop by using the mapping definition 22 (step S15).

Then, the data conversion unit 33 discards the first row, shifts the second row to the first row, and reads a new single row in the second row (step S16). The data conversion unit 33 determines whether or not the read single row includes an end of the data (step S17). A record including the end of the data indicates, for example, a blank row (row to which nothing is set). In a case where it is determined that the read single row is a row including the end of the data (step S17; Yes), the data conversion unit 33 determines that the row is the final row of the input-completed sheet 24 and ends the data conversion processing.

In a case where it is determined that the read single row does not include the end of the data (step S17; No), the data conversion unit 33 shifts to step S14 so as to process two new rows.

In a case where it is determined in step S14 that the character string in the "AREA" column in the second row is not the same as that in the first row (step S14; No), the data conversion unit 33 determines that the first row is the final row of the block. In other words, the data conversion unit 33 determines that the second row is the start row of the block.

Then, the data conversion unit 33 determines whether or not the character string in the "AREA" column in the second row is the same as an area name of the next or subsequent blocks in the mapping definition 22 (step S18). For example, the data conversion unit 33 acquires a character string associated with the next AREA item from the hierarchical structure of the Y-axis header in the mapping definition 22. Then, the data conversion unit 33 compares the character string in the "AREA" column in the second row with the acquired character string. Then, in a case of inconsistency, the data conversion unit 33 acquires a character string associated with a subsequent AREA item from the hierarchical structure of the Y-axis header in the mapping definition 22 and repeats processing for comparing the character string in the "AREA" column in the second row with the acquired character string.

Then, in a case where it is determined that the character string and the area name are not the same (step S18; No), the data conversion unit 33 indicates an error and notifies that the area name is invalid (step S19) and ends the data conversion processing.

In a case where it is determined that the character string and the area name are the same (step S18; Yes), the data conversion unit 33 determines whether or not the character string in the "SHOP" column in the first row is the same as the character string of the subtotal (for example, "subtotal") in the mapping definition 22 (step S20). In a case where it is determined that the character strings are not the same (step S20; No), the data conversion unit 33 indicates an error and notifies that the subtotal is invalid (step S21) and ends the data conversion processing.

In a case where it is determined that the character strings are the same (step S20; Yes), the data conversion unit 33 acquires the character string of the subtotal that is the character string in the "SHOP" column in the first row and executes the mapping processing on the subtotal (step S22).

Then, the data conversion unit 33 determines whether or not the character string in the "AREA" column in the second row is the same as the character string of the total (for example, "Total") in the mapping definition 22 (step S23). In a case where it is determined that the character strings are not the same (step S23; No), the data conversion unit 33 updates the hierarchical structure of the mapping definition 22 on the memory (step S24). Then, the data conversion unit 33 shifts to step S16 so as to read the next row.

In a case where it is determined that the character strings are the same (step S23; Yes), the data conversion unit 33 executes the mapping processing on the total in the second row (step S25). Then, the data conversion unit 33 ends the data conversion processing.

[Example of Use of Information Processing Apparatus]

Figure 9:
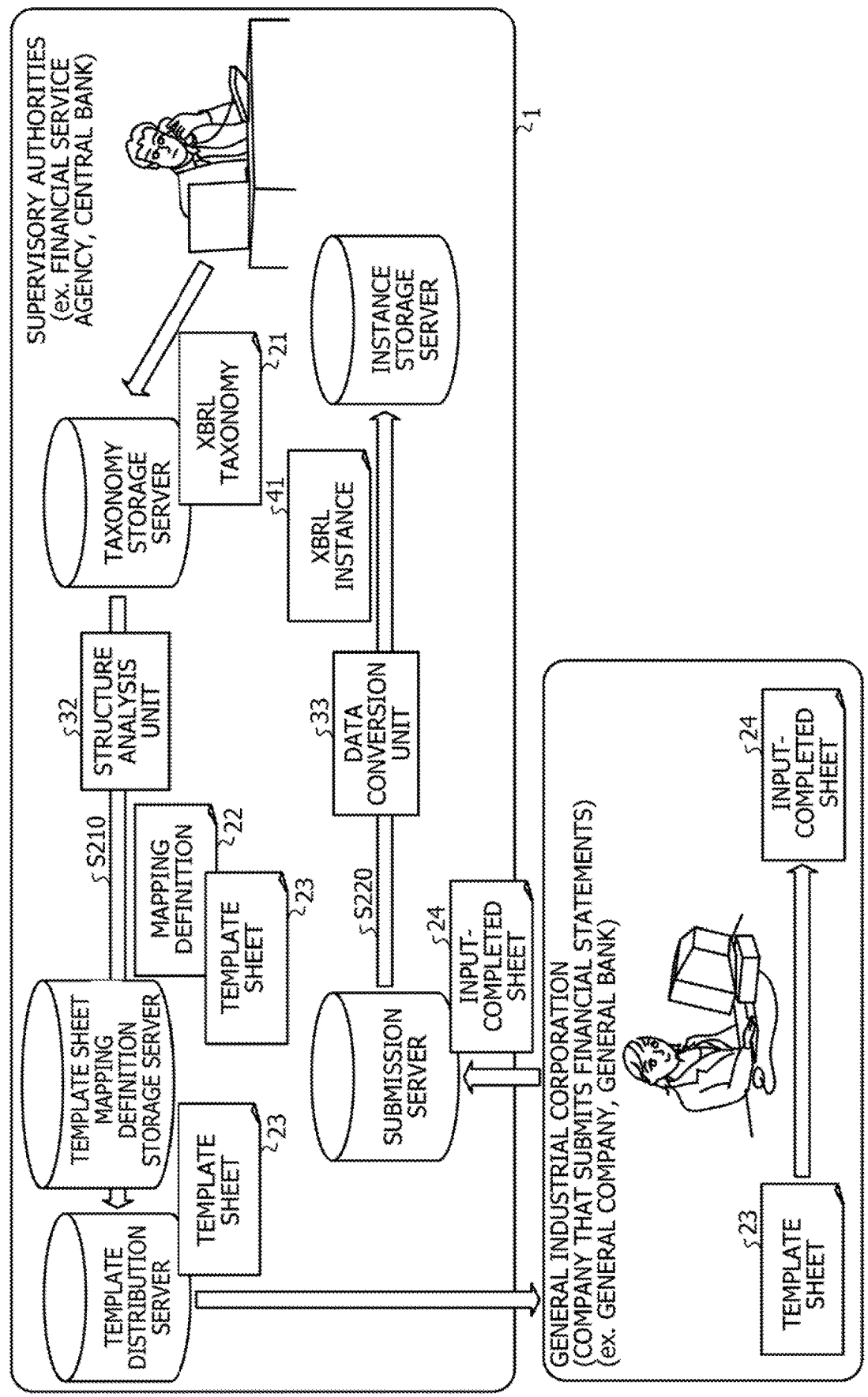
FIG. 9 is a diagram illustrating an example of a use of the information processing apparatus according to the embodiment.

Next, an example of a use of the information processing apparatus according to the embodiment will be described with reference to FIG. 9. FIG. 9 is a diagram illustrating an example of the use of the information processing apparatus according to the embodiment. As illustrated in FIG. 9, the information processing apparatus 1 is provided on the side of the supervisory authority. The supervisory authority creates the XBRL taxonomy 21. Then, the structure analysis unit 32 inputs the created XBRL taxonomy 21 and generates the template sheet 23 and the mapping definition 22 by using the input XBRL taxonomy 21 (S210). The supervisory authority opens the generated template sheet 23 and mapping definition 22 to the public and allows the company that submits the financial statements to acquire the template sheet 23. The company that submits the financial statements inputs financial data by using the acquired template sheet 23 and creates the input-completed sheet 24. Then, the data conversion unit 33 inputs the input-completed sheet 24 and converts the input input-completed sheet 24 into the XBRL instance 41 (S220).

Note that the information processing apparatus 1 illustrated in FIG. 9 is a server model provided on the side of the supervisory authority. However, the information processing apparatus 1 is not limited to this. The information processing apparatus 1 may be a client model provided on the side of the company that submits the financial statements.

[Effect of Embodiment]

According to the above embodiment, the information processing apparatus 1 receives the template sheet 23 and acquires the mapping definition 22 indicating the correspondence relationship between the item included in the template sheet 23 and the item included in the XBRL instance 41 having a format different from the template sheet 23. The information processing apparatus 1 acquires the item value associated with the identification information of the template sheet 23 with reference to the hierarchical structure of the Y-axis header that stores the item value associated with a specific item included in a sheet in association with the identification information (for example, Y-axis header) of the sheet. The information processing apparatus 1 compares the item value associated with the specific item with the item value acquired from among the items included in the input-completed sheet 24. The information processing apparatus 1 specifies a target item associated with an item value associated with a second item included the input-completed sheet 24 from among the items included in the XBRL instance 41 on the basis of the comparison result and the mapping definition 22. According to the configuration, the information processing apparatus 1 compares the item value associated with the specific item included in the input-completed sheet 24 with the item value acquired with reference to the hierarchical structure of the Y-axis header stored in association with the identification information (for example, Y-axis header) of the template sheet 23. As a result, the information processing apparatus 1 can enhance the accuracy for specifying the item of the XBRL instance 41 associated with the item value included in the input-completed sheet 24 when the input-completed sheet 24 is converted into the XBRL instance 41.

Furthermore, in a case where a comparison result between the item value associated with the specific item from among the items included in the input-completed sheet 24 and the item value acquired with reference to the hierarchical structure of the Y-axis header indicates inconsistency, the information processing apparatus 1 shifts to the processing for acquiring the item value so as to acquire an item value in the next order. Then, the information processing apparatus 1 acquires the item value in the next order associated with the identification information of the input-completed sheet 24 with reference to the hierarchical structure of the Y-axis header. According to the configuration, the information processing apparatus 1 can enhance the accuracy for specifying the item of the XBRL instance 41 associated with the item value included in the input-completed sheet 24 when the input-completed sheet 24 is converted into the XBRL instance 41.

Furthermore, in a case where the comparison result between the item value associated with the specific item and the item value further acquired with reference to the hierarchical structure of the Y-axis header indicates consistency, the information processing apparatus 1 updates the item value associated with the specific item of the hierarchical structure of the Y-axis header. According to the configuration, the information processing apparatus 1 can execute next mapping processing at high speed by updating the hierarchical structure of the Y-axis header.

[Program or the Like]

Note that it has been described that the data conversion unit 33 compares the item value associated with the specific item with the item value acquired with reference to the mapping definition 22 (hierarchical structure of Y-axis header) from among the items included in the input-completed sheet 24. For example, the data conversion unit 33 compares the item value associated with AREA as a specific item and the item value acquired with reference to the mapping definition 22 (hierarchical structure of Y-axis header) from among the items included in the input-completed sheet 24. As an example, the data conversion unit 33 compares "Tokyo" or the like as the item value of the AREA item included in the input-completed sheet 24 with "Tokyo" or the like as the item value of the hierarchical structure of the Y-axis header. At this time, after normalizing the item values to be compared, the data conversion unit 33 may perform the comparison. The normalization may be, for example, to remove blanks before and after the item value to be compared, to unify the all characters to lowercase letters, or to unify all the characters to half-width characters. With this normalization, for example, even when a part of the item values of the AREA item of the input-completed sheet 24 is changed to uppercase or lowercase letters, the data conversion unit 33 can perform mapping without assuming the inconsistency in the comparison as an error when the mapping is performed by using the mapping definition 22.

Furthermore, the information processing apparatus 1 can be realized by mounting each function of above the control unit 3, the storage unit 2, or the like on an information processing apparatus such as an existing personal computer or a workstation.

Furthermore, each component of the information processing apparatus 1 is not necessarily physically configured as illustrated in the drawings. In other words, specific aspects of separation and integration of the information processing apparatus 1 are not limited to the illustrated ones, and all or a part of the apparatus can be functionally or physically separated and integrated in an arbitrary unit according to various loads, use states, or the like. For example, the input unit 31 and the structure analysis unit 32 may be integrated as a single unit. The data conversion unit 33 and the output unit 34 may be integrated as a single unit. On the other hand, the structure analysis unit 32 may be divided into a first generation unit that generates the mapping definition 22 and a second generation unit that generates the template sheet 23. Furthermore, the storage unit 2 such as the XBRL taxonomy 21, the mapping definition 22, the template sheet 23, or the input-completed sheet 24 may be connected via a network as an external device of the information processing apparatus 1.

Figure 10:
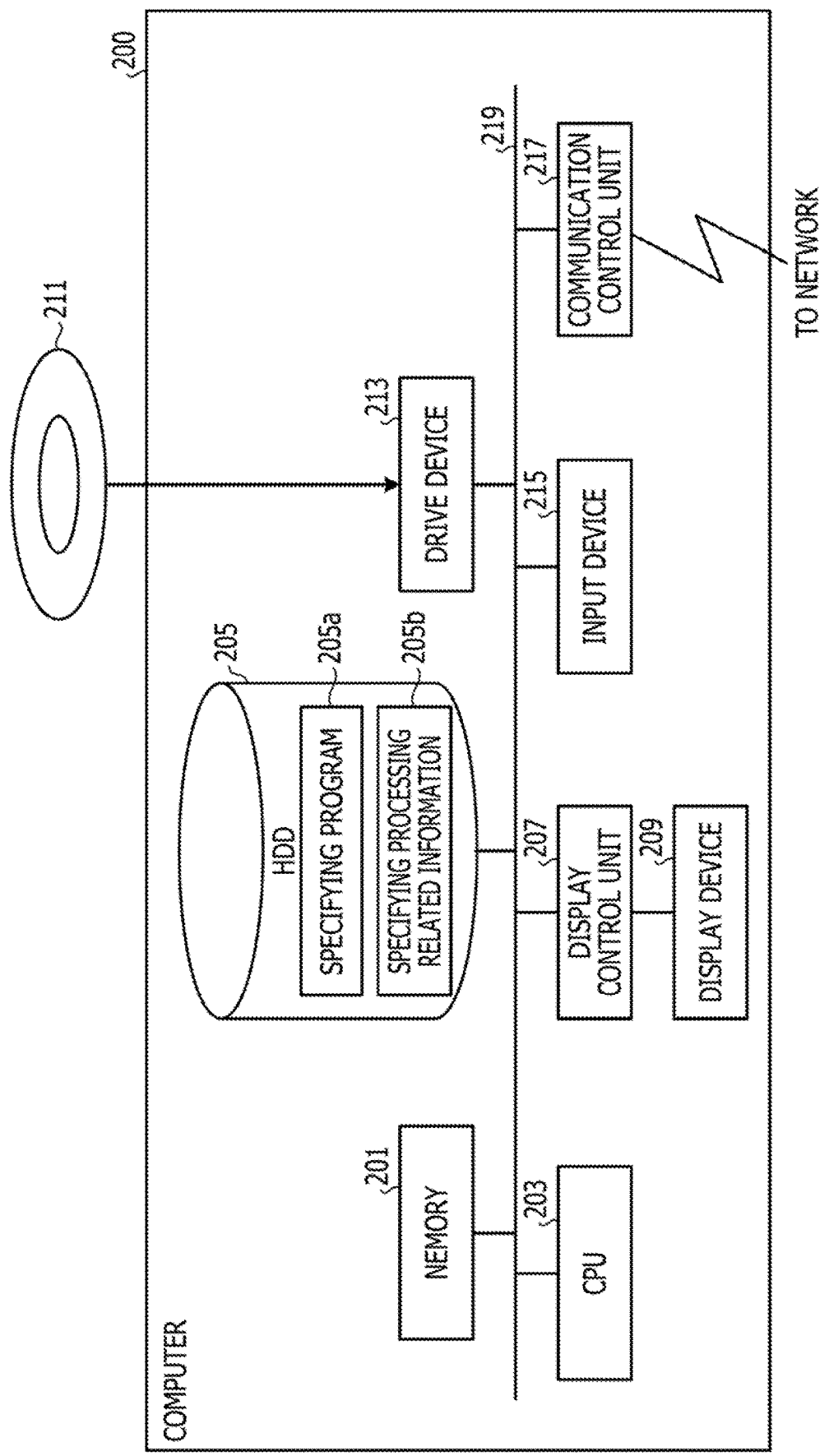
FIG. 10 is a diagram illustrating an example of a computer that executes a specifying program.

Furthermore, various sorts of processing described in the above embodiment can also be implemented by executing a program prepared in advance on a computer such as a personal computer or a workstation. Therefore, in the following description, an example of a computer which executes a specifying program having a function similar to the information processing apparatus 1 illustrated in FIG. 1 will be described. FIG. 10 is a diagram illustrating an example of the computer that executes the specifying program.

As illustrated in FIG. 10, a computer 200 includes a Central Processing Unit (CPU) 203 that executes various calculation processing, an input device 215 that receives data input from a user, and a display control unit 207 that controls a display device 209. Furthermore, the computer 200 also includes a drive device 213 that reads a program or the like from a storage medium, and a communication control unit 217 that exchanges data with another computer via a network. Furthermore, the computer 200 includes a memory 201 that temporarily stores various information and a Hard Disk Drive (HDD) 205. Then, the memory 201, the CPU 203, the HDD 205, the display control unit 207, the drive device 213, the input device 215, and the communication control unit 217 are connected by a bus 219.

The drive device 213 is, for example, a device for a removable disk 211. The HDD 205 stores a specifying program 205a and a specifying processing related information 205b.

The CPU 203 reads the specifying program 205a and develops the program to the memory 201. The specifying program 205a functions as a specifying process.

For example, the specifying process corresponds to each functional unit of the control unit 3. The specifying processing related information 205b corresponds to the XBRL taxonomy 21, the mapping definition 22, the template sheet 23, and the input-completed sheet 24.

Note that the specifying program 205a does not necessarily need to be stored in the HDD 205 from the beginning. For example, the program is stored in a "portable physical medium" such as a flexible disk (FD), a Compact Disk Read Only Memory (CD-ROM), a Digital Versatile Disk (DVD), a magneto-optical disk, or an Integrated Circuit (IC) card, which are inserted into the computer 200. Then, the computer 200 may read the program 205a from these media and execute the program 205a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium recording a specifying program for causing a computer to execute processing comprising:
   receiving a first file;
   acquiring information indicating a correspondence relationship between an item included in the first file and an item included in a second file having a format different from format of the first file;
   acquiring an item value associated with identification information of the received first file with reference to a storage that stores an item value associated with a specific item included in a file in association with the identification information of the file;
   comparing the item value associated with the specific item among the items included in the received first file with the acquired item value; and
   specifying a target item associated with an item value associated with a second item included in the received first file among items included in the second file on the basis of the comparison result and the acquired information, wherein a processing of the comparing shifts to a processing to acquire the item value so as to acquire a next item value in a case where a comparison result between the item value associated with the specific item among the items included in the first file and the item value acquired with reference to the storage indicates inconsistency, a processing of the acquiring acquires the next item value associated with the identification information of the received first file with reference to the storage, and the processing of the comparing updates the item value associated with the specific item stored in the storage in a case where the comparison result between the item value associated with the specific item and the item value further acquired with reference to the storage indicates consistency.

2. An information processing apparatus comprising:

a memory; and a processor coupled to the memory and configured to:
receive a first file;
acquire information indicating a correspondence relationship between an item included in the first file and an item included in a second file having a format different from format of the first file;
acquire an item value associated with identification information of the received first file with reference to the memory that stores an item value associated with a specific item included in a file in association with the identification information of the file;
compare the item value associated with the specific item among the items included in the first file with the item value;
specify a target item associated with an item value associated with a second item included in the received first file among items included in the second file on the basis of the comparison result and the information;
shift to a processing to acquire the item value so as to acquire a next item value in a case where a comparison result between the item value associated with the specific item among the items included in the first file and the item value acquired with reference to the memory indicates inconsistency;
acquire the next item value associated with the identification information of the received first file with reference to the memory; and
update the item value associated with the specific item stored in the memory in a case where the comparison result between the item value associated with the specific item and the item value further acquired with reference to the memory indicates consistency.

3. A specifying method for causing a computer to execute processing comprising:

receiving a first file; acquiring information indicating a correspondence relationship between an item included in the first file and an item included in a second file having a format different from format of the first file;

acquiring an item value associated with identification information of the received first file with reference to a storage that stores an item value associated with a specific item included in a file in association with the identification information of the file;

comparing the item value associated with the specific item among the items included in the received first file with the acquired item value; and specifying a target item associated with an item value associated with a second item included in the received first file among items included in the second file on the basis of the comparison result and the acquired information, wherein a processing of the comparing shifts to a processing to acquire the item value so as to acquire a next item value in a case where a comparison result between the item value associated with the specific item among the items included in the first file and the item value acquired with reference to the storage indicates inconsistency, a processing of the acquiring acquires the next item value associated with the identification information of the received first file with reference to the storage, and the processing of the comparing updates the item value associated with the specific item stored in the storage in a case where the comparison result between the item value associated with the specific item and the item value further acquired with reference to the storage indicates consistency.

* * * * *